United States Patent [19]

Murtha

[11] Patent Number: 5,002,379
[45] Date of Patent: Mar. 26, 1991

[54] BYPASS MIRRORS

[76] Inventor: R. Michael Murtha, 1010 Janetwood Dr., Oxnard, Calif. 93030

[21] Appl. No.: 336,808

[22] Filed: Apr. 12, 1989

[51] Int. Cl.⁵ .......................... G02B 5/08; G02B 7/18; G02B 3/08; F24J 2/38
[52] U.S. Cl. .................................. 350/613; 350/612; 350/616; 350/452; 126/425; 126/438
[58] Field of Search ............... 350/613, 614, 618, 619, 350/620, 628, 629, 167, 168, 440, 616, 442–443, 612, 452, 608, 262; 126/438, 425, 438, 448; 136/246, 243; 250/233.4, 214 AL; 159/903; 323/906

[56] References Cited

U.S. PATENT DOCUMENTS

3,861,379  1/1975  Anderson .............................. 126/425
4,139,286  2/1979  Hein et al ............................ 126/438

Primary Examiner—Bruce Y. Arnold
Assistant Examiner—James Phan

[57] ABSTRACT

Advanced reflector elements are provided to greatly improve the focusing capabilities of multisurface, light concentrating mirrors. The reflector elements utilize a subconcentrator feature to focus light which is then transmitted, or bypassed, through an adjacent element's lens feature, greatly shortening the distance that light rays must travel to a receiver. The result is a more uniform density of concentrated power at the receiver, generated by a module of much shorter focal length. The bypass elements of this invention permit new extreme module geometries, such as: (1) ninety degree rim angle hyperbolic dishes and troughs where f/D=0.125, (2) very shallow conical reflectors, (3) flat concentrator mirrors that can be pointed directly at the light source with little loss of light, and (4) positive focal length convex reflectors.

16 Claims, 9 Drawing Sheets

BYPASS MIRRORS

BACKGROUND OF THE INVENTION

This invention relates to the collection of radiant energy such as sunlight or laserlight. More particularly, the present invention is concerned with novel reflector elements that allow for the formation of a new category of light concentrating, multiple surface, primary mirrors.

A multisurface primary mirror is a type of collector that is composed of tilted mirror elements which, together, bring a large area of light to a focus upon a small receiver. These nonimaging optical systems are relatively inexpensive and easy to maintain due to their "segmented" nature. For example, if an element is broken, only that element need be replaced, rather than the entire mirror unit. In many circumstances they are a superior choice of reflector for terrestrial and space applications.

A mirror's capacity to accurately redirect light to a receiver is adversely affected by any slope errors of its reflective surface. This is true for all mirror types and, with the promising arrival of retroreflective material, where two reflections take place, control of surface angular errors becomes even more critical. As for multisurface mirrors, although kept to a minimum during production, slope errors have the cumulative effect of defocusing the character of concentrated light in the focal zone. The net result is a costly reduction in power availability at the receiver. A simple solution to this would be to shorten the distances that reflected rays must travel by placing the receiver much closer to the mirror surfaces. If this could be done, the effect of slope errors would then be greatly diminished, resulting in a more accurate mirror that would produce a more dense concentration of light at the receiver. This concept has never been exploited in the prior art. Previously, multisurface mirror focal lengths were kept long because, if the receiver was positioned too near the collector, major light losses occurred due to the blockage of reflected rays by adjacent mirror elements.

The "bypass" mirror elements of this invention make it possible to bring the receiver and mirrors much closer together than ever before, while nearly eliminating loss of light. It is intended that these reflectors be employed within the concentrating photovoltaic, photothermal and remote sensing technologies.

SUMMARY OF THE INVENTION

The primary object of the present invention is to improve the radiation focusing capabilities of multisurface, light concentrating, primary mirrors by placing the receiver very close to the reflecting surfaces. A shortening of optical paths is accomplished through the use of elements of novel design that overcome the sunlight blockage constraints of the prior art. The mirror elements of the present invention not only reflect light, but also bypass light through adjacent mirror elements. Extreme multisurface mirror geometries, directly attributable to bypass elements, will become apparent from the following detailed description and accompanying drawings.

DESCRIPTION OF THE PREFERRED EMBODIMENTS

This invention is amenable to innumerable modifications and alternative constructions. Therefore, only preferred embodiments are referred to in the description, shown in the drawings and set forth in the claims.

Figure 1:
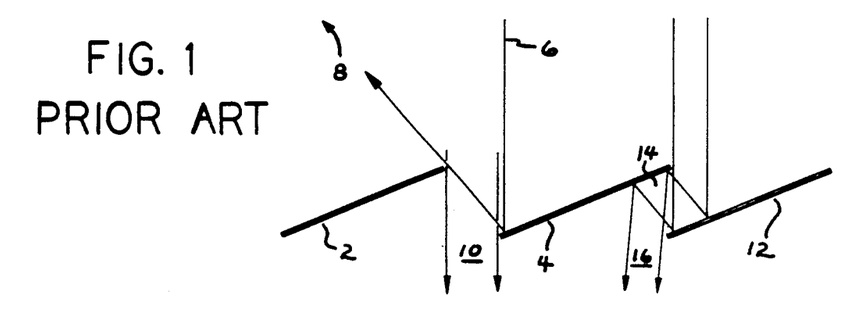
FIG. 1 is an end view of three diagonal mirror elements from the prior art.

Turning now to FIG. 1 there are shown three diagonal mirror elements in a side by side arrangement. These three reflectors are representative of the normal limitations on reflection geometries of multisurface mirrors of the prior art. When elements 2 and 4 were spaced apart sufficiently, ray 6 could be reflected from the lower part of element 4 and just clear the top edge of element 2 on its way toward the receiver 8. However, this leaves a gap 10 between the elements allowing a large amount of light, and therefore power, to be lost. If the gap is closed, by placing elements 4 and 12 closer together, then the reflected light 14 is blocked by the adjacent element's top edge resulting in a similar loss of light 16.

Design considerations for multisurface mirrors have always been dominated by these basic light loss mechanisms. However, it is the same "stepped" nature of these reflectors that provides an opportunity to overcome the light loss restrictions of the past.

Figures 2, 3, 4:
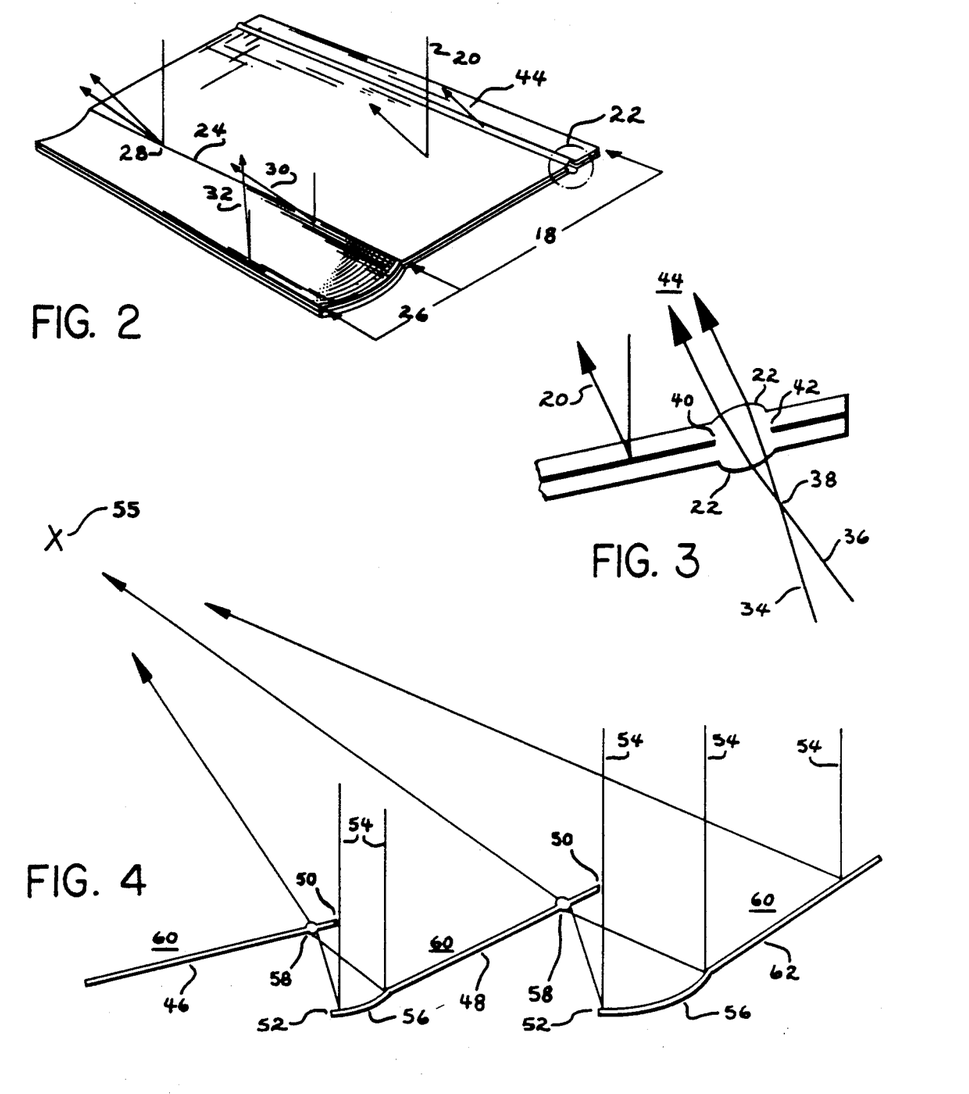
FIG. 2 is a perspective view of the first embodiment of a bypass mirror element.
FIG. 3 is a close-up view of the correction lens of the bypass element of FIG. 2.
FIG. 4 is an end view of three diagonal bypass mirror elements using the features of FIG. 2 and FIG. 3.

In FIG. 2 there is shown the first "light bypassing" mirror element of the present invention. This preferred embodiment is a glass or plastic "sandwich" construction having two outer protective layers with an inner reflective layer. Majority section 18 reflects most of the incident light such as 20 to a receiver. Located in the upper half, within majority section 18, is a path correction lens 22 and window slit. Ridge 24 delineates section 18 from section 26 and produces a splitting of ray 28 so as to eliminate loss of light at the top edge of the next inner element. Section 26 is a subconcentrator that is, in this case, an off-axis linear parabola. This feature concentrates light laterally into a line focus of approximately 10:1 geometric concentration ratio. Subconcentrated light 30 and 32 is directed upwardly and is to be coincident with the under surface of the path correction lens section on the next inwardly adjacent element.

In FIG. 3 marginal rays 34 and 36, from the subconcentrator of the next outwardly adjacent element, converge at focus 38. The rays cross and diverge, then impinge the under surface of cylindrical path correction lens 22. The two surfaces of this path correction lens can be spherical in cross section but are preferably aspherical so as to cause as little light dispersion as possible. Rays 34 and 36 enter the thick lens and are refracted at a predetermined angle in accordance with Snell's law. They propagate through the optically clear material, passing between reflective surface edges 40 and 42 that define a window slit. The light then exits through a similarly curved upper surface where it is further refractively deviated resulting in a parallel ray bundle 44 of approximately 10:1 geometric concentration ratio. Emerging beam 44 can be tailored to any reasonable intensity to be coincident with the majority reflections 20 upon the receiver.

FIG. 4 is an end view of a multisurface mirror consisting of three diagonal bypass elements. Compare this with FIG. 1. It can be seen that innermost bypass element 46 and intermediate element 48 each has a top edge 50 that overlaps the bottom edge 52 of the next outwardly adjacent element. This insures that all incoming light will be utilized. If the elements of FIG. 4 are circular, then incoming light rays 54 will reach the receiver 55 only if the elements are made to track the light source in two axes (altitude and azimuth). If the elements of FIG. 4 are linear, they need only be tracked in one axis, since subconcentrator 56 and path correction lens 58 are in a fixed relationship and 58 is located in the focal plane of 56. Subconcentrator and path correction sections always run coextensive of the elements.

Of the three diagonal elements of FIG. 4, intermediate element 48 is constructed with all the same features as in FIG. 2. It should be noted that innermost bypass element 46 contains only a path correcting lens 58 integrated with the majority section 60. There is no need for a subconcentrator since all of its reflected light will transit unobstructed to the receiver. Similarly, outermost bypass element 62 contains only a subconcentrator section 56 integral with its majority section 60. There is no need for a path correction lens since, as the outermost element, there is no reflected light that it must transmit. If intermediate element 48 is removed and the outermost element is moved inward to fill the gap, then the minimal condition to qualify as a bypass multisurface mirror is satisfied, that condition being that at least two elements, with at least one bypassing feature each, constitutes a concentrating mirror of the present invention.

Figure 5:
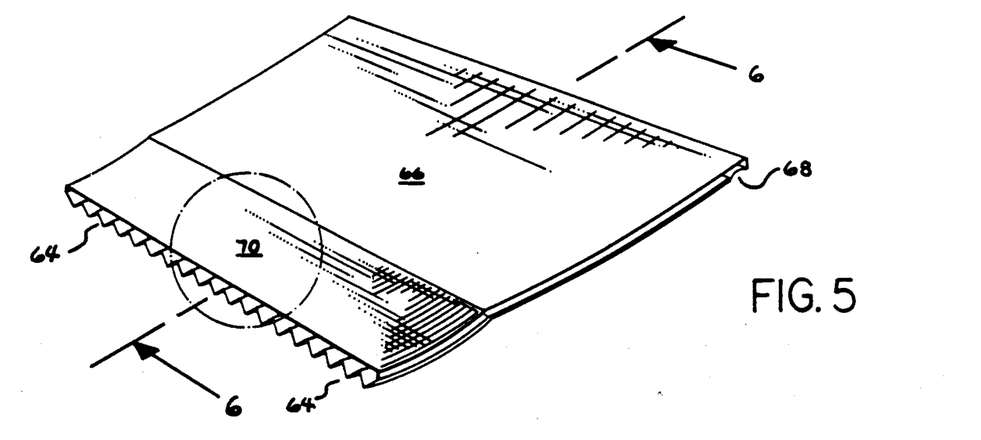
FIG. 5 is a perspective view of the second embodiment of a bypass element.

Using similar concepts, in FIG. 5 there is shown a second preferred embodiment that is a single piece, plastic, retroreflective, prismatic sheet. Instead of a reflective metal layer, a plurality of linear ninety degree prisms 64, that produce a total internal reflection (TIR) of light to the receiver, are used in a bypass element. This retroreflective material, as detailed in U.S. Pat. Nos. 4,120,565 and 4,154,219, has very high efficiency potential. Majority section 66 reflects the majority of light to the receiver. Path correction lens 68 is located at the top edge within the majority section 66. Located in the element's lower half is the off-axis parabolic subconcentrator section 70. In a linear focus module the straight bypass mirror elements would contain TIR prisms that are identical and parallel. In a spot focus module circular elements would contain prisms that gradually taper to a point at the innermost element below the receiver. In both cases the longitudinal axis of the prisms must be kept parallel with a plane bisecting the light source and the receiver. In other words, spot and line focus modules that employ elements containing TIR prisms must be pointed directly at a light source for maximum efficiency.

Figure 6:
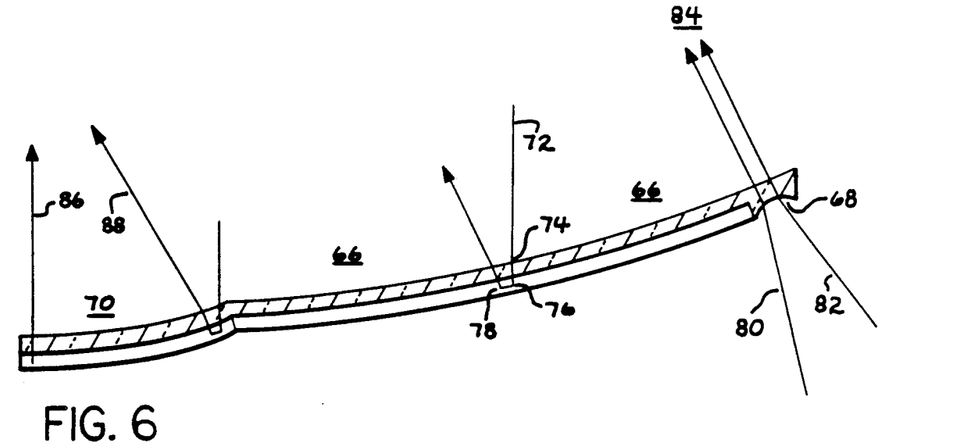
FIG. 6 is a cross-sectional view taken along line 6—6 of FIG. 5.

FIG. 6 is a cross-sectional view taken along line 6—6 of FIG. 5. As shown in this figure, majority section 66 reflects the majority of incoming light as represented by ray 72. This ray is incident upon the upper surface at 74 and is refracted downward where it impinges the first forty-five degree angled prism face 76, is totally reflected across to the opposite prism face 78, to be totally reflected once more. Ray 72 now propagates to the upper surface, emerges, and in so doing, is refracted directly at the receiver. Cylindrical correction lens 68 can be seen accepting concentrated light rays 80 and 82 from the subconcentrator of the next outwardly adjacent element. The rays impinge the negative aspheric lens, are refracted, then transit the lens proper, to exit the upper surface as a parallel bundle of rays 84, finally merging with majority rays 72 at the receiver. The rays 86 and 88 will be traced in greater detail in FIG. 7.

Figure 7:
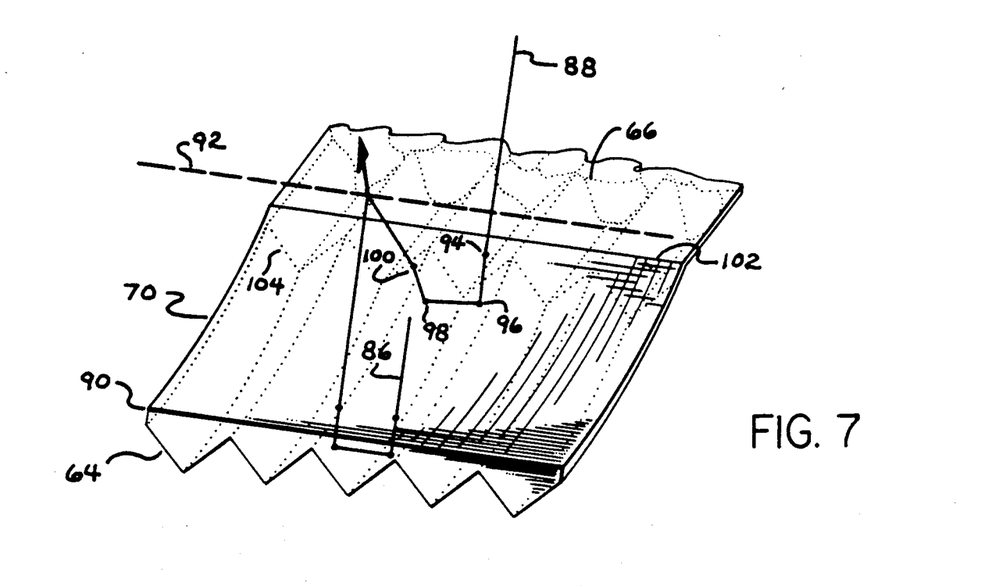
FIG. 7 is a partial view of the subconcentrator section of FIG. 5 and FIG. 6.

The trough shaped subconcentrator 70 of FIG. 7 has an upper surface 90 and TIR prisms 64 of parabolic curvature. The parabola condenses rays 86 and 88 laterally into a line focus that is to be coincident with linear correction lens 92 located on the next inwardly adjacent element. This action is identical to rays 80 and 82 at correction lens 68 in FIG. 6. For example, ray 88 enters the upper surface at 94 and is refracted to first prism face 96 where it is totally internally reflected (TIR'd), and displaced inwardly across to second prism face 98. Here, it is reflected upward, exiting the upper surface at 100 and, refracting toward the under surface of correction lens 92 of the next inwardly adjacent bypassing element. It can be seen that ridge 102 marks the boundary separating the subconcentrator 70 with that of majority section 66. A corresponding upset 104 further delineates where integral prisms abruptly change inclination.

Figure 8:
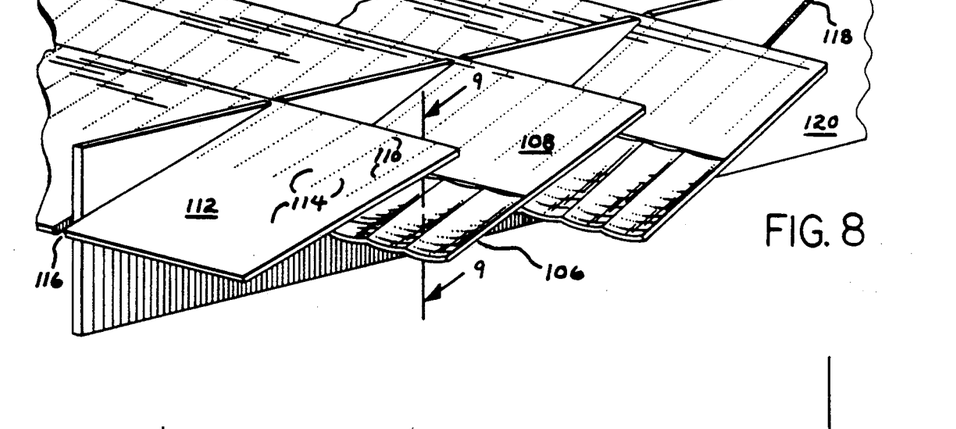
FIG. 8 is a representational perspective view of the third embodiment of a bypass element.

In FIG. 8 there is shown the third preferred embodiment of the present invention, employing sandwich type elements and a different strategy for bypassing action. In this version, multiple subconcentrators and correction lenses run perpendicular to the longitudinal axis of the elements. For example, subconcentrator section 106, located in the lower half of element 108, is populated with integral parabolic troughs in a side by side relationship. Path correction lens section 110, located in the upper half of element 112 is populated with a multiplicity of cylindrical lenses bordered by majority sections 114. Each correction lens 110 is approximately one-twentieth as wide as its corresponding subconcentrator trough 106, resulting in a 20:1 geometric concentration ratio of the emergent light. Reflector elements can be circular or linear and must be held rigidly tilted in place by one of the many prior art basing modes. In this case, interlocking slots 116 on each element are coupled with matching angled slots like 118 of the support rib 120. This multisurface unit's optical axis must be trained directly at a light source.

Figure 9:
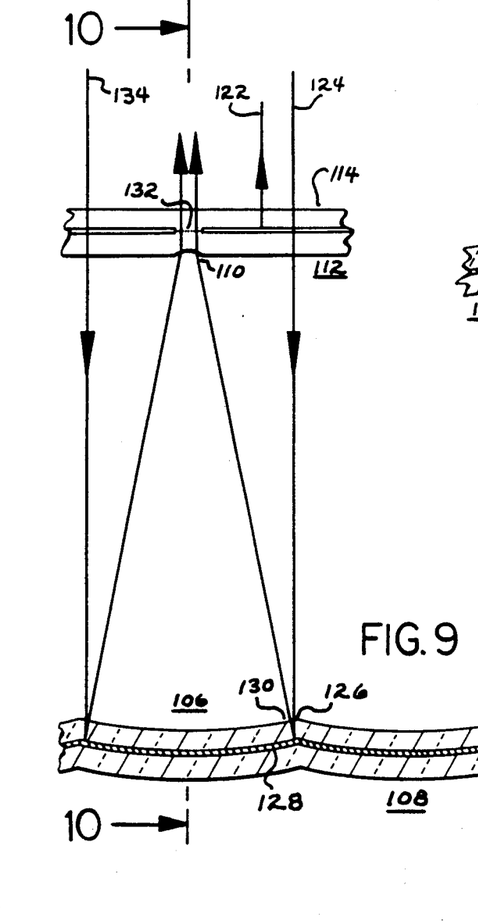
FIG. 9 is a cross-sectional view taken along line 9—9 of FIG. 8.

FIG. 9 is a cross-sectional view taken along line 9—9 of FIG. 8. It can be seen that most of the light, such as 122, is reflected by the majority mirror section 114. Path correction lens 110 is located in this section. The other component of light 124, that which used to be lost in the prior art, travels downward behind inner element 112 and is incident upon the upper surface 126 of parabolic subconcentrator 106. The ray is first refracted at this surface and then reflected at the metalized layer 128. It is angularly deviated by refraction one more time as it exits 130 in the direction of the path correction lens. Finally, ray 124 is refracted by aspheric negative correction lens 110 and is conducted through a window slit 132, defined by two aluminum edges. It then emerges from the smooth upper surface of inner element 112, tracing a path along with majority light 122, toward the receiver. The distance between the inner element 112 and the outer element 108, in relation to the surface shapes of the subconcentrator 106 and path correction lens 110 have been preselected, through optical design, to produce the sharpest focalization for an intermediate (yellow) wavelength of light. Each subconcentrator trough 106 has a parabolic cross section with a profile height that gradually develops from one end of the trough to the other. Each trough is shallowest, producing the longest focal length, near the bottom edge. An intermediate focal length is generated near the middle, while a shorter focus is developed at the deep end. The resultant slanted focal line matches the tilt angle difference between the elements 112 and 108, insuring that the focal line and linear correction lens are coplanar.

Figure 10:
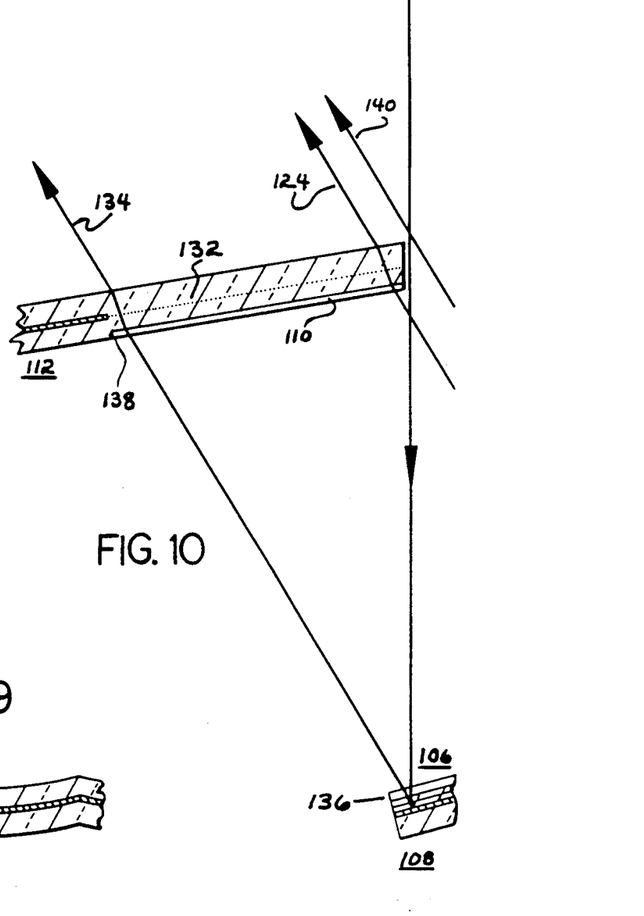
FIG. 10 is a cross-sectional view taken along line 10—10 of FIG. 9.

FIG. 10 is a cross-sectional view taken along line 10—10 of FIG. 9. In this figure shortest ray 124 can be seen propagating through the path correction lens as in FIG. 9. Longest ray 134, produced by the shallow end 136 of the subconcentrator trough 106, transits the window slit 132, near the end 138 of lens 110. Rays 124 and 134 will be coincident upon the receiver along with majority rays 122 and 140.

Figures 11, 12:
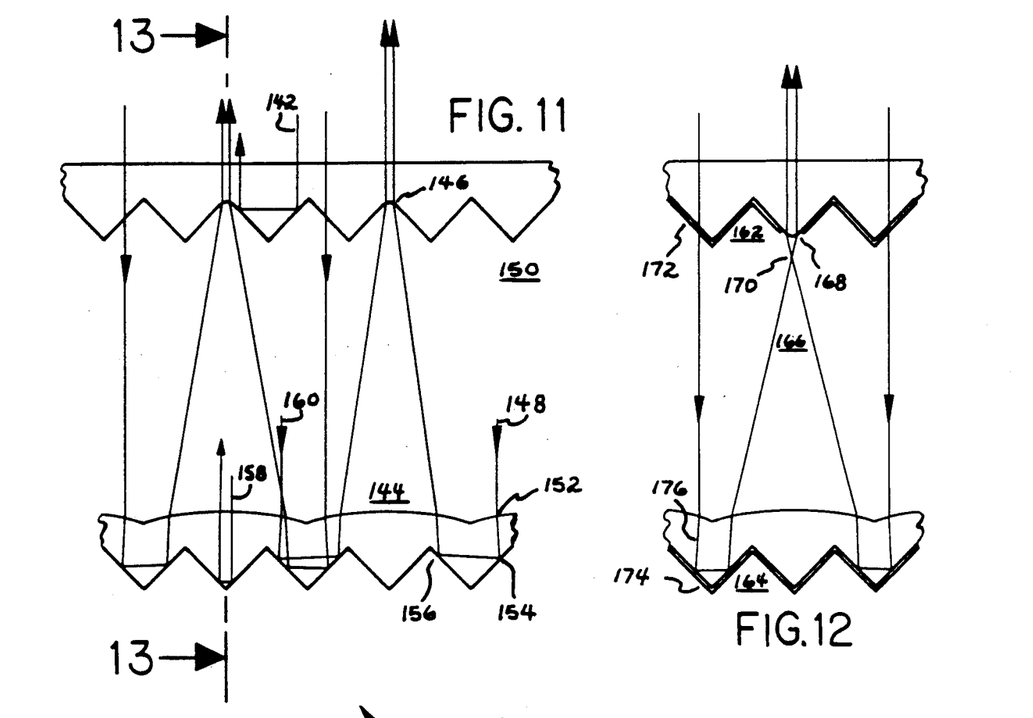
FIG. 11 is a representational end view of the fourth embodiment of a bypass element.
FIG. 12 is a representational end view of a variation of the bypass element of FIG. 11.

FIG. 11 is the fourth preferred embodiment of bypass elements It is similar in appearance to FIG. 8 because the subconcentrators and path correction lenses run perpendicular to the element's long edges. Each prismatic element is a single piece construction made of compression molded acrylic plastic. Integral TIR prisms also run perpendicular to the longitudinal axis of each element. A majority of the incident light 142 is reflected by majority section prisms in the straightforward two-reflection geometry. Subconcentrator section of the outwardly adjacent element, consists of convex cylindrical lenses, like 144, in a side by side relationship. Each subconcentrator lens is positioned over two TIR prisms and produces a lateral convergence of light upon its corresponding path correction lens, as 146. The curved upper surface of each subconcentrator sets up a different chain of events than those experienced by light incident upon the flat upper surface of the majority section. For example, ray 148 drops down behind innermost element 150 and impinges a subconcentrator lens at 152. It is immediately refracted laterally, to a small degree, by that curved upper surface. The curvature of the convex surface has been chosen so as not to bend the light more than a few degrees because acrylic (n=1.49) has a critical angle of forty-two degrees, six minutes. The ray 148 propagates downward and impinges the first prism face 154 at an angle (measured from a normal to that plane) greater than forty-two degrees, six minutes. The ray is TIR'd across to second prism face 156. It impinges that plane at greater than the critical angle and is TIR'd upward. Ray 148 then emerges from a point on the curved upper surface of identical adjacent cylinder lens 144 and is refracted directly toward the correction lens 146. Other rays, such as 158, enter and exit near the vertex of a subconcentrator lens, and are only minimally deviated. Rays 148 and 160 converge at negative, aspheric, diverging, path correction lens 146 located at the prism tip between two majority prisms. The light is refracted at a predetermined angle and then emerges from the upper surface on its way to the receiver. In practice the individual isosceles prisms have, for example, a base approximately two mm wide, located on an element that is also approximately two mm thick.

FIG. 12 is similar to FIG. 11 except that innermost element prisms 162 have been shifted by half-a-prism in relation to the outer element prisms 164. This allows concentrated beam 166 to bypass the innermost element by transmitting through a prism valley 168 rather than a prism tip. The outwardly curved correction lens at prism valley 168 requires that the converging light 166 come to a focus 170 before entering the lens. The lens surface can be spheric since multisurface mirrors are nonimaging systems, where the resolving power of the bypassing features is not critical. Aluminized prisms in the majority section 172 assures that light impinging prism tip and valley edges will stand a better chance of reaching the receiver. Note that the area surrounding correction lens section 168 has been left unmetalized during film deposition, creating a window slit that allows the light to pass unobstructed. Aluminized prisms 174 of the subconcentrator will capture all high angled light 176 allowing the optical engineer a wider selection of focal lengths and concentration ratios.

Figure 13:
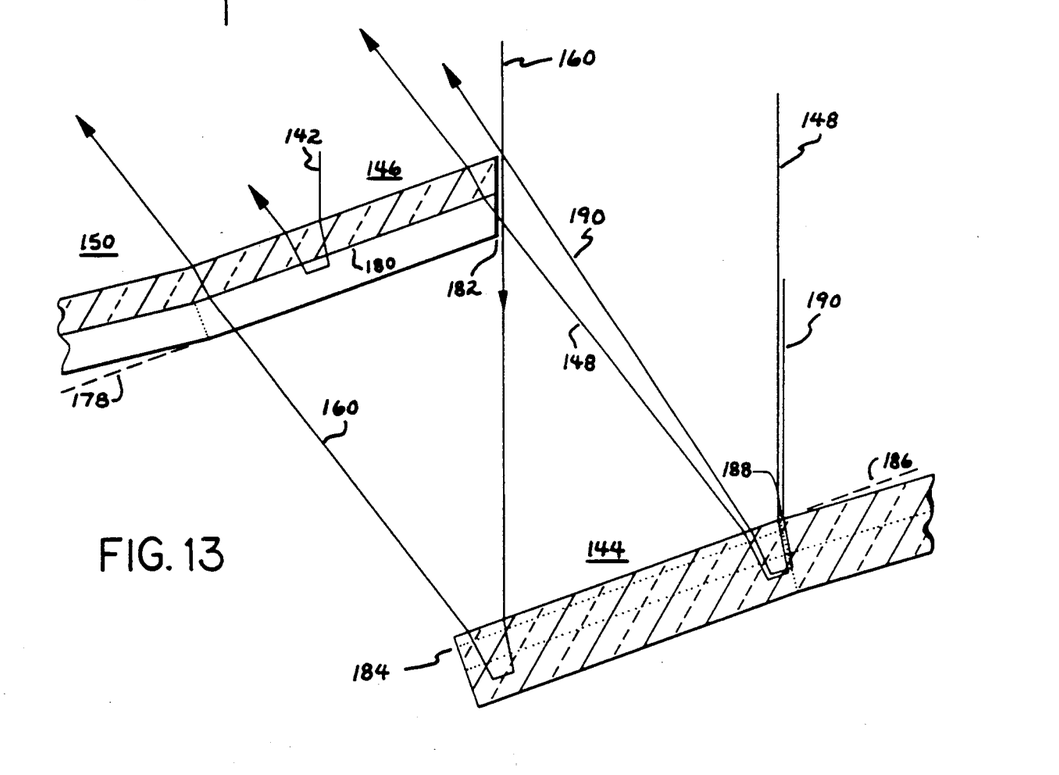
FIG. 13 is a cross-sectional view taken along line 13—13 of FIG. 11.

FIG. 13 is a cross-sectional view taken along line 13—13 of FIG. 11. It shows the length of the focused linear beam produced by subconcentrator 144. It should be understood that in most bypass multisurface mirror configurations each element's inclination increases from the horizontal as it is situated farther from the receiver. The angular difference between the correction lens 146 of innermost element 150 and the subconcentrator 144 of the outer element should be minimized to keep the optics simple and insure beam accuracy upon the receiver. One way to insure that a focal line will properly transit a linear correction lens would be to tilt-up 178 the lens section 146, from one to four degrees, so that its slope matches that of subconcentrator section 144. Then, every point along the focal line will impinge the surface of the correction lens simultaneously, with few aberrations. All majority rays 142 will still arrive at the receiver, having been shifted inward a small amount. Lens center 180 can be thicker than either end, thus further converging the subconcentrated light. End face 182 at the top edge is to be parallel with incoming rays 160, and is to overlap the bottom edge 184 of the outer element so as to prevent loss of incoming light at the edges or between the elements. Ray 148 misses end face 182 as a direct result of the subconcentrator section 144 being tilted-down 186 a small amount. Ridge 188 marks the boundary between subconcentrator 144 and the majority section. All rays to the right of ridge line 188 will initially refract and reflect at less of an angle than those rays to the left of the ridge. For example, ray 190 contacts to the right of ridge line 188 and therefore emerges at a sufficiently different angle which allows it to miss the end face 182 and reach the receiver.

Figures 14, 15:
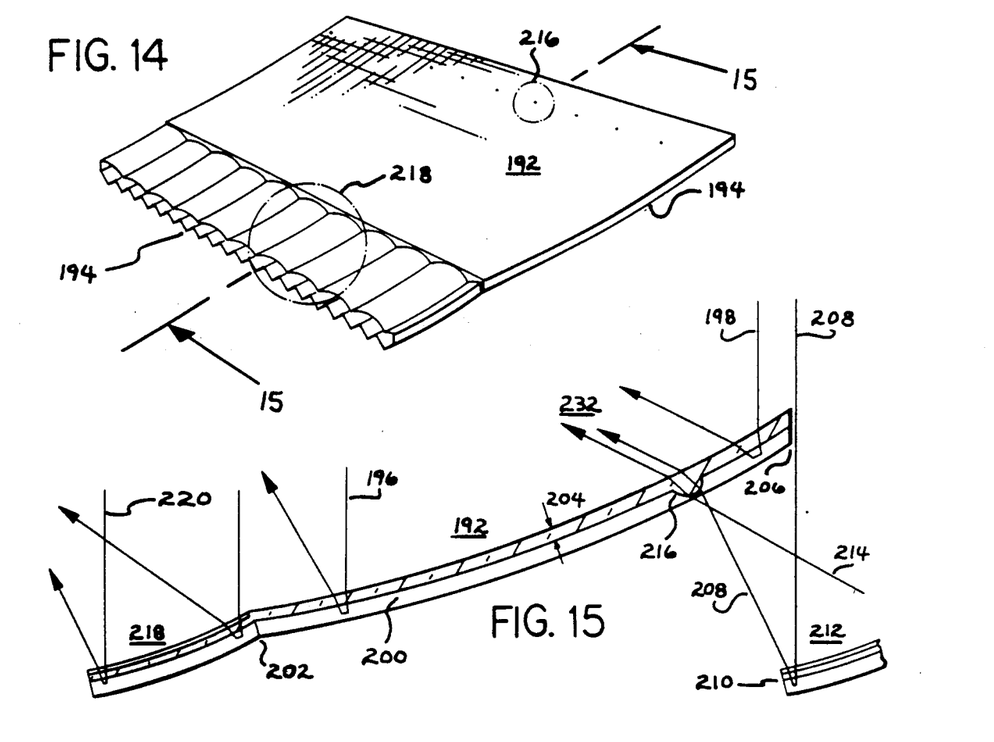
FIG. 14 is a perspective view of the fifth embodiment of a bypass element.
FIG. 15 is a cross-sectional view taken along line 15—15 of FIG. 14.

The bypass element of FIG. 14 is representative of the fifth preferred embodiment of the present invention. The majority section 192 is flanked by a subconcentrator in the lower half and correction lenses in the upper half. As with the other four embodiments, the element need only manifest a separate subconcentrator feature along with a majority section, or a correction lens feature along with the majority section, to qualify as a bypass element. It is similar in appearance to the other embodiments except that this element bypasses a plurality of discrete beams of light, along with the majority rays, to the receiver. This element is constructed of integral prismatic, retroreflective, (TIR) material 194 though an equivalent sandwich construction, similar to that in FIG. 2 and FIG. 8, is conceivable.

FIG. 15 is a cross-sectional view taken along line 15—15 of FIG. 14. Majority section 192 is concavely curved to enhance the concentration of light 196 and 198 at the receiver. Facet 200 is the near face of one of the prisms. Boundary line 202 marks a distinction between subconcentrator and majority sections and is coincident with all the prism bases. Thickness 204 maintains the integral prisms and bypassing features in rigid alignment. End face 206 is flat and parallel with incoming ray 208. End face 206 just overlaps the bottom edge face 210 at the subconcentrator 212 of the next outwardly adjacent element. That subconcentrator 212 has brought rays 208 and 214 to convergence at lens 216 for a path correction.

Figure 16:
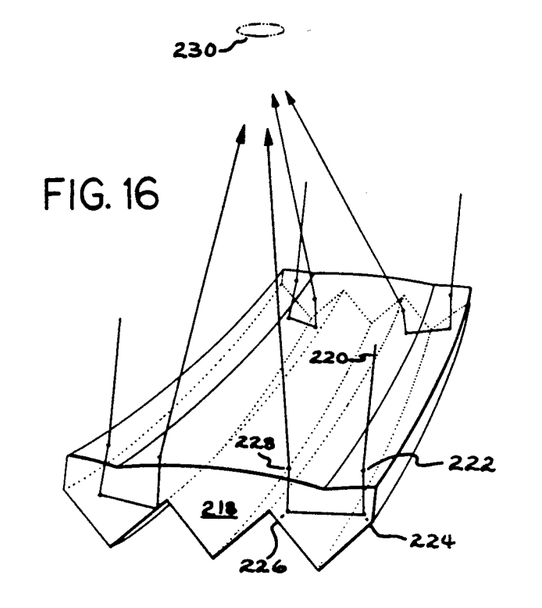
FIG. 16 is a partial view of the subconcentrator section of FIG. 14 and FIG. 15.

FIG. 16 shows a portion of subconcentrator 218 of this embodiment. It is a multiple spot focus integral optic that is produced by combining the subconcentrator geometries of FIG. 7 and FIG. 11. Ray 220 is incident upon the scalloped upper surface of a parabolic cylinder lens at 222 and is refracted down to the first prism face 224. At this point 224 ray is totally reflected, displaced inwardly and across to second prism face 226 to undergo a similar tack. The ray then propagates to the upper surface of the adjacent identical cylinder lens where it emerges 228, refracting directly at a dedicated path correction lens 230 of the inwardly adjacent element. It is imagined that the concentration ratio generated by the subconcentrator 218 will approach 25:1.

Figure 17:
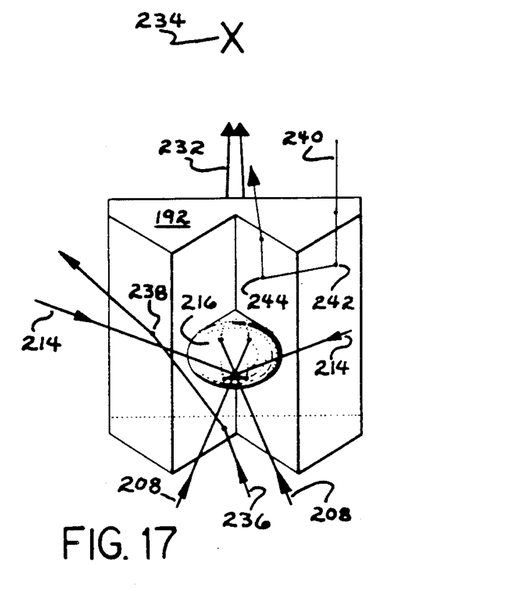
FIG. 17 is a close-up view of the correction lens section of FIG. 14 and FIG. 15.

In FIG. 17 it can be seen that the heat associated with greater concentration ratios will not damage prismatic material, as it would with a metalized sandwich construction, because the high intensity beam will pass through the prism unobstructed and unabsorbed. For example, rays 208 and 214 will enter the integral lens 216, refract and emerge as a pencil of rays 232 toward the receiver 234. If the ray is off-axis, as 236, it may enter the prism then exit the upper surface 238 as lost energy, escaping while not damaging the element. The correction lenses 216 reside in the majority section 192 located in the upper half of the element. Most of the incoming light will not interact with either a subconcentrator or correction lens. Most will enter the majority section as ray 240, refract, reflect 242, and displace azimuthally across to the second prism face 244, then reflecting out the upper surface directly to the receiver 234. Like the other four embodiments, this element 192 is to be based so that its long edges are parallel with a plane extending through the collector's rim.

Prismatic sheet is highly efficient for reflecting light. However, if conventional sandwich type mirror is preferred then a metalized layer of either aluminum or silver will be utilized as the reflecting surface. Metalized mirror technology is generally well known throughout the world and would be especially familiar to a person who works directly with the materials in the existing glass or plastic mirror industry. Bypass mirror elements are catadioptric, being both reflective and transmissive of light. The transmissive feature requires a modification of the element employing another well known technique, that of masking an area in preparation for thin film deposition. As shown in FIG. 3 and FIG. 9 a nonmetalized area called a window slit, is needed to transmit concentrated light from an outwardly adjacent bypass element. The upper layer of a sandwich construction mirror is masked, or overlaid, with a narrow strip of tape that runs the full length of the proposed area. A highly reflective film of aluminum or silver is then thermally evaporated onto the back surface of the upper sheet and tape. The tape is then removed leaving a narrow window slit between the edges of which concentrated light is passed. Soon thereafter, a nearly identical under layer sheet, including any preformed correction lens, is to be adhesively coupled with the upper and middle layers, forming a bypass element.

No new technology is needed to produce bypass mirror elements If the elements are to be a TIR prismatic construction, then separate elements would be compression molded while integral elements would be injection molded. Presently, acrylic and polycarbonate plastics offer the best optical and physical properties. If the individual elements are to be constructed of TIR prismatic glass then a hot-pressing technique, such as that used in making automobile headlights, would be employed. In the future, graded-index glass or plastic elements could result in nearly flat correction lenses and subconcentrators.

If broken, individual elements have the advantage of being easily replaced on their rib support structures. Maintenance strategies would be altered depending on the many variations of prior art rib structure types. For example, single elements would be relatively easy to replace. Other basing modes would include ribs that incorporate angled profiles of open (sawtooth) or, closed (pierced) configuration. Another support structure is a spoke network of wires that run radially through nested elements as can be seen in some lamp shades of today. For any basing mode if support ribs are integral or separate, the individual reflective elements must be maintained in a fixed relationship with one another so that unit profile will be maintained, insuring accurate bypassing action during tracking of the light source.

All receivers referenced in the disclosure are well known in the art. Some bypass configurations are better adapted to certain energy conversion devices, but as long as the spot or line focus requirement is met then, generally, they are interchangeable. The energy conversion devices, or receivers, are to include: photovoltaic cells and photodetectors, photothermal pipes and engines, submillimeter wave transceivers, fiber optics, lasants, and crucibles. In practice one would choose a bypasser, with the fewest possible elements, that would best illuminate a particular receiver. For simplicity, it is intended that secondary reflectors are to be considered "receivers". It will be seen that secondary optics can be utilized to great advantage in nearly all bypass multisurface mirror configurations.

Figure 18:
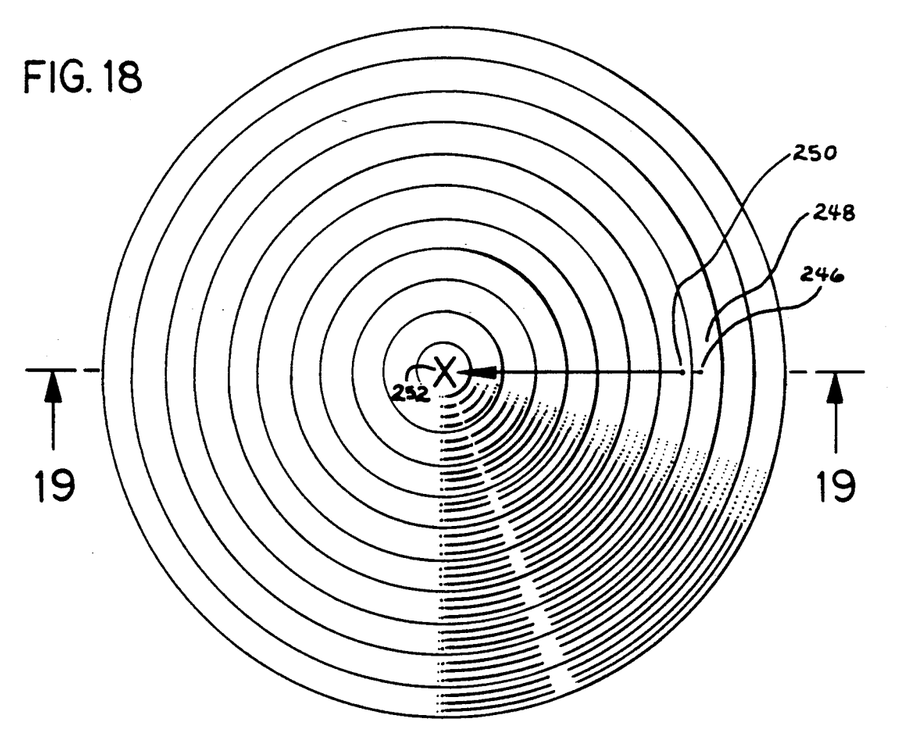
FIG. 18 is a plan view of a circular aperture, spot focus, hyperboloidal reflector using bypass elements.

In FIG. 18 there is shown a concave multisurface mirror unit using annular bypass reflector elements. It is a spot focus module with concentric rings of progressively increasing radius and tilt angle. The elements can be either of sandwich or of prismatic construction. This view is aligned with the circular module's optical axis just as a light source of normal incidence would "see" it. Incoming light energy, as represented by ray 246, is initially reflected by an element 248 and part of that energy is bypassed 250 through the adjacent inner element. All of the rays propagate to a central receiver 252 to be converted into another form of energy such as electricity.

Figure 19:
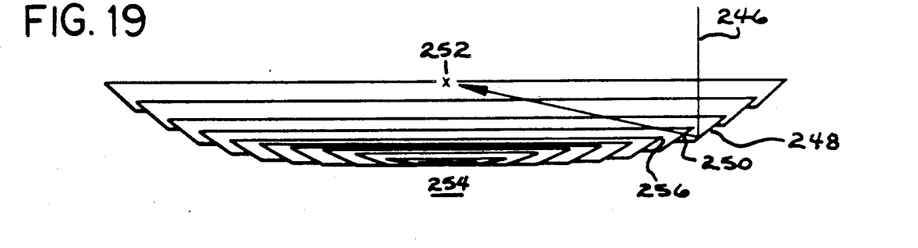
FIG. 19 is a cross-sectional view taken along line 19—19 of FIG. 18.

FIG. 19 is a cross-sectional view taken along line 19—19 of FIG. 18. It portrays a few of the advantages that a design engineer can extract by using bypass elements. For instance, the f/D ratio (focal length/diameter ratio) of the bypass multisurface, hyperboloidal dish of FIG. 19 is f/D=.125, with a ninety degree rim angle. By comparison, the well known ninety degree rim angle, continuous curve, paraboloidal dish has an f/D=.250. This means that the bypass unit is half as high as a parabolic dish while collecting the same amount of light. Alternately, if the units are of equal height, then the bypass unit is two times wider than the parabolic dish, gathering four times the amount of light. The reflector's extreme aspect ratio of 8:1 can be attributed in part to the flat concentrator section 254 in the central region of the unit. The unit can be seen as a hyperbolic curve by imagining a line that runs through the center of all the elements, on either side of flat section 254. The curve is regulated by a light ray's 246 ability to bypass 250 through the first inner element and clear the top edge of the second inner element 256 on its way to the receiver 252.

Figure 20:
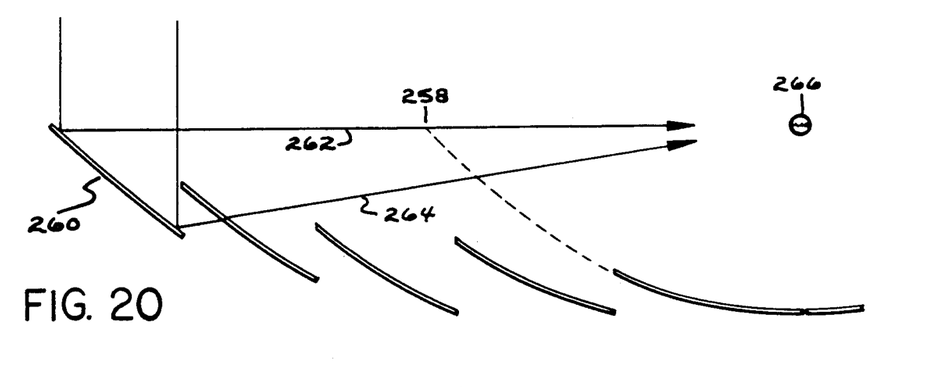
FIG. 20 is an end view of a rectangular aperture, line focus, hyperbolic reflector, using bypass elements.

FIG. 20 is an end view of the left half of a bypass multisurface mirror. Similar to spot focus FIG. 19, it is a linear focus hyperbolic trough with a ninety degree rim angle. As few as five (per side) concavely curved bypass elements make up this f/D=.125 linear module. Point 258 is where a ninety degree rim angle parabolic trough's outer edge would normally extend to, halfway to the outer edge of the bypass unit. If their heights are the same, as is shown, then the bypassing unit will direct twice as much light onto a linear receiver. Outermost element 260 reflects majority ray 262 and subconcentrated and corrected ray 264 to receiver 266, a pipe, containing heat transfer fluid.

Figure 21:
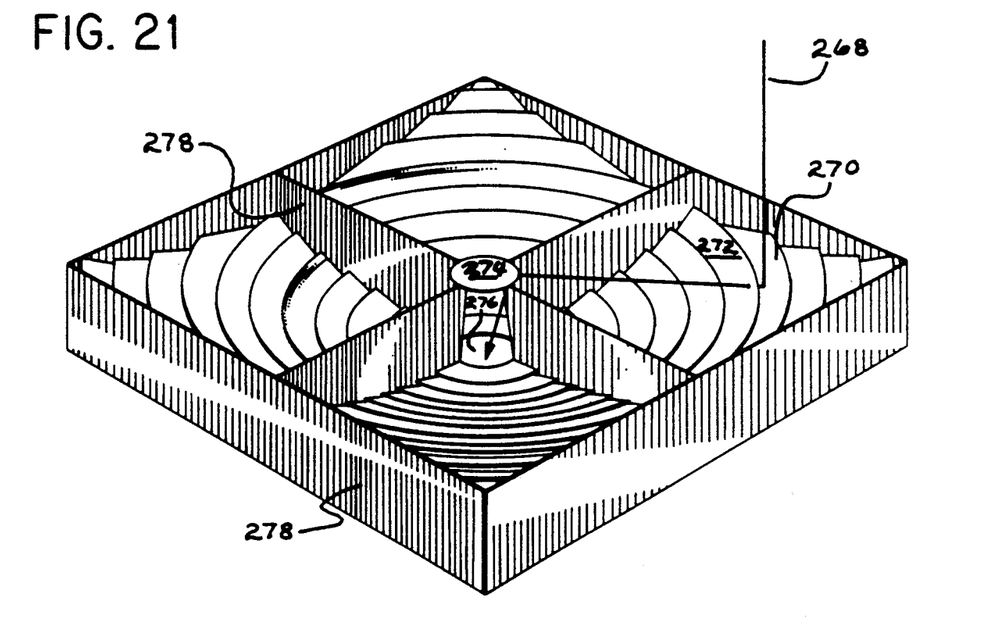
FIG. 21 is a perspective view of a square aperture, spot focus, hyperbolic reflector, using bypass elements.

FIG. 21 is that of a square configured, hyperbolic, point focus, bypass multisurface mirror. Ray 268 reflects from element 270 and is bypassed through next inner element 272 on its way to secondary reflector 274, which redirects all the light onto a receiver 276. The elements are to be held in place by one of the many types of well known stiffening ribs 278. In this instance the mirror is a one-piece injection molded unit. The outer structural rib is square which maximizes collection of light when many of these units are placed side by side in an array. Each module can reach a 10:1 aspect ratio, measured diagonally, with little loss of light.

Figure 22:
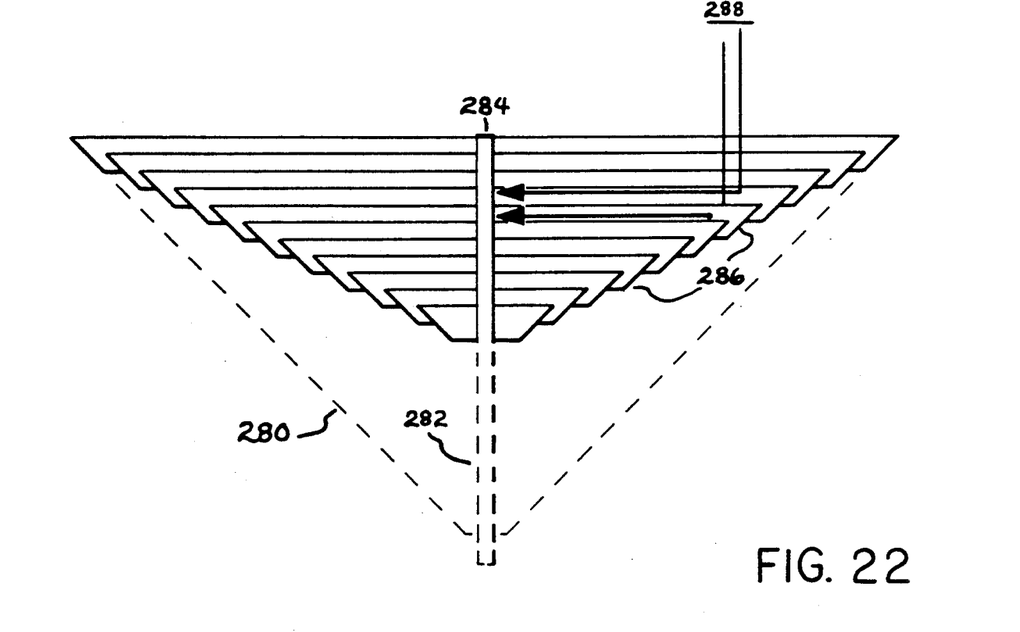
FIG. 22 is a cross-sectional view of a circular aperture, line focus, conical reflector, using bypass elements.

The bypass mirror of FIG. 22 shows the improvement in aspect and concentration ratios that can be obtained over the well known line focus cone 280. In the cone 280, light is reflected by a forty-five degree surface to a central focal region 282 that is coincident with the cone's axis of symmetry. In the cross-section view of FIG. 22, it can be seen that using bypassing elements allows the cone to become much more shallow resulting in a corresponding shorter linear focus and higher temperatures. The receiver 284, a heat pipe, will be subjected to a doubling of light intensity, since its length has been nearly halved while the aperture (the cone's base) remains the same. Identical bypass elements 286 are arranged in a straight line, reflecting and bypassing light rays 288 with little loss of light. It is possible to bypass light through two or more inner elements and this unit would be especially well suited to such an arrangement.

Figure 23:
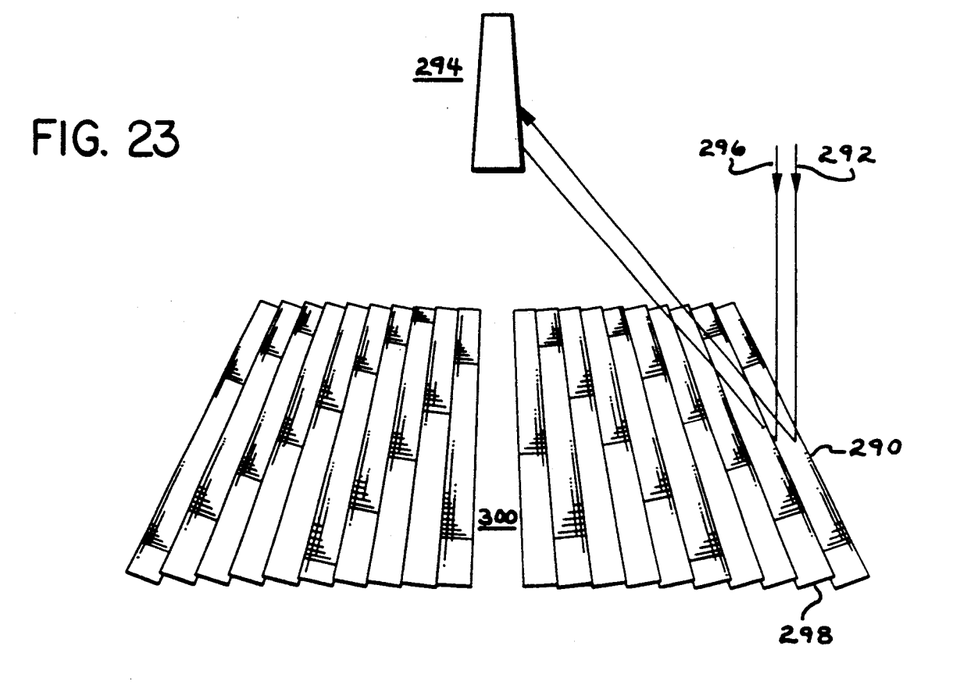
FIG. 23 is a perspective view of a rectangular aperture, line focus, planar reflector, using bypass elements.

Single line focus, planar configured, multisurface mirrors of the past had to be steered off-axis to the sun to avoid major loss of light between the reflector elements (see FIG. 1 for explanation). Bypass mirror elements now allow this configuration, as in FIG. 23, to be aimed directly at the sun with little loss of light. The linear element 290 reflects ray 292 regularly to linear photovoltaic receiver 294, while ray 296 is reflected by 290 and bypassed through element 298 in the same direction. Gap 300 is where the shadow from the receiver will occur. A f/D=.250, with a sixty-five degree rim angle, is obtainable. It should be understood that since the flat concentrator module can now be pointed at right angles to the sun, each side of the module is now identical, eliminating complexity and expense.

Figure 24:
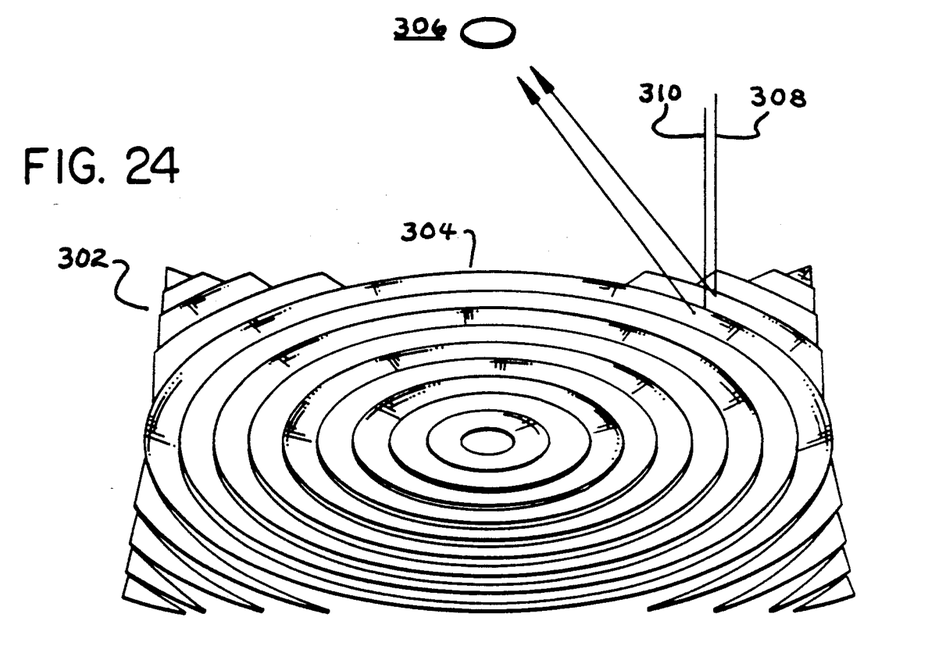
FIG. 24 is a perspective view of a square aperture, spot focus, planar reflector, using bypass elements.

Flat spot focus module, FIG. 24 can now be pointed directly at the sun with little loss of light, while possessing the advantage of being symmetrical about its optical axis. This applies to the square spot focus module 30 as well as the circular component 304 therein. Each concentric ring is tilted at a different angle, increasing in slope as its distance from the receiver 306 also increases. Ray 308 reflects regularly toward the receiver while ray 310 is reflected and then bypassed through the next inner adjacent element on its way to the receiver. In practice, all light focused toward the receiver will result in a high intensity blur rather than an image. The planar module can also be configured as a hexagon or any other equiangular polygon.

Figure 25:
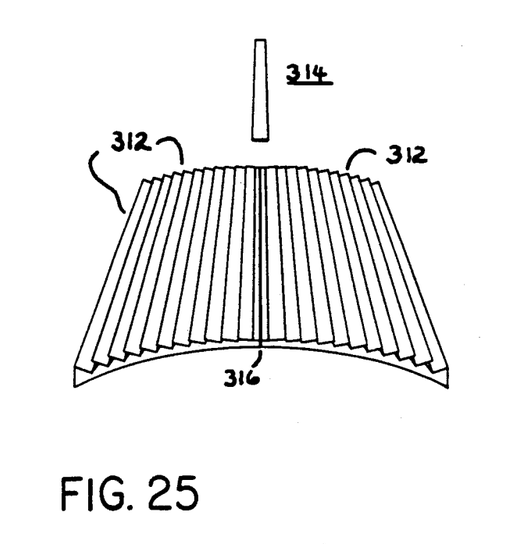
FIG. 25 is a perspective view of a rectangular aperture, line focus, convex reflector, using bypass elements.

As shown in FIG. 25, bypass mirror elements now make it possible to design multisurface mirrors that are outwardly curved. This allows the concentrator to be self-supporting due to gravity. The "arched" linear focus module of FIG. 25, which has its vertex 316 nearest the light source, would be correctly called a positive focal length, convex reflector. Both halves of the module are congruent for simplified fabrication. Each halve's bypassing elements 312 are progressively tilted as they retreat from the linear receiver 314 and vertex 316. For maximum efficiency the modules optical axis should be pointed directly at the light source. However, since it is a line focus, it can be effectively tracked in one axis if the elements of FIG. 2 are used. The conical version of this bypass multisurface mirror is shown in FIG. 26.

Figure 26:
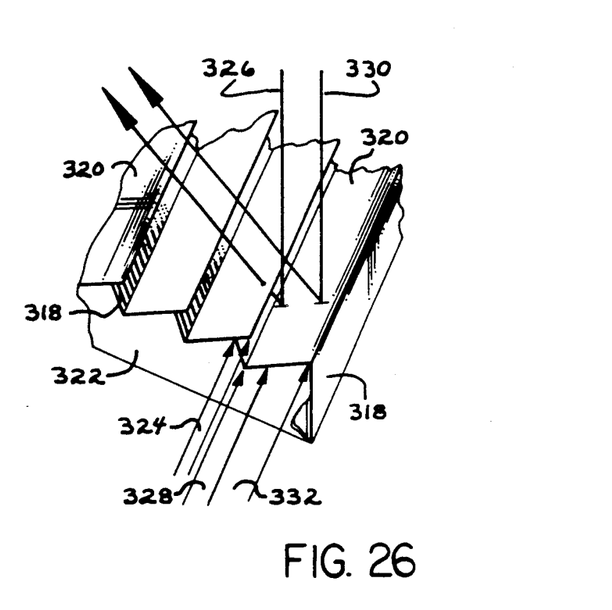
FIG. 26 is a close-up representational view of an element basing mode for conical versions of FIG. 25 and FIG. 27.
Figure 27:
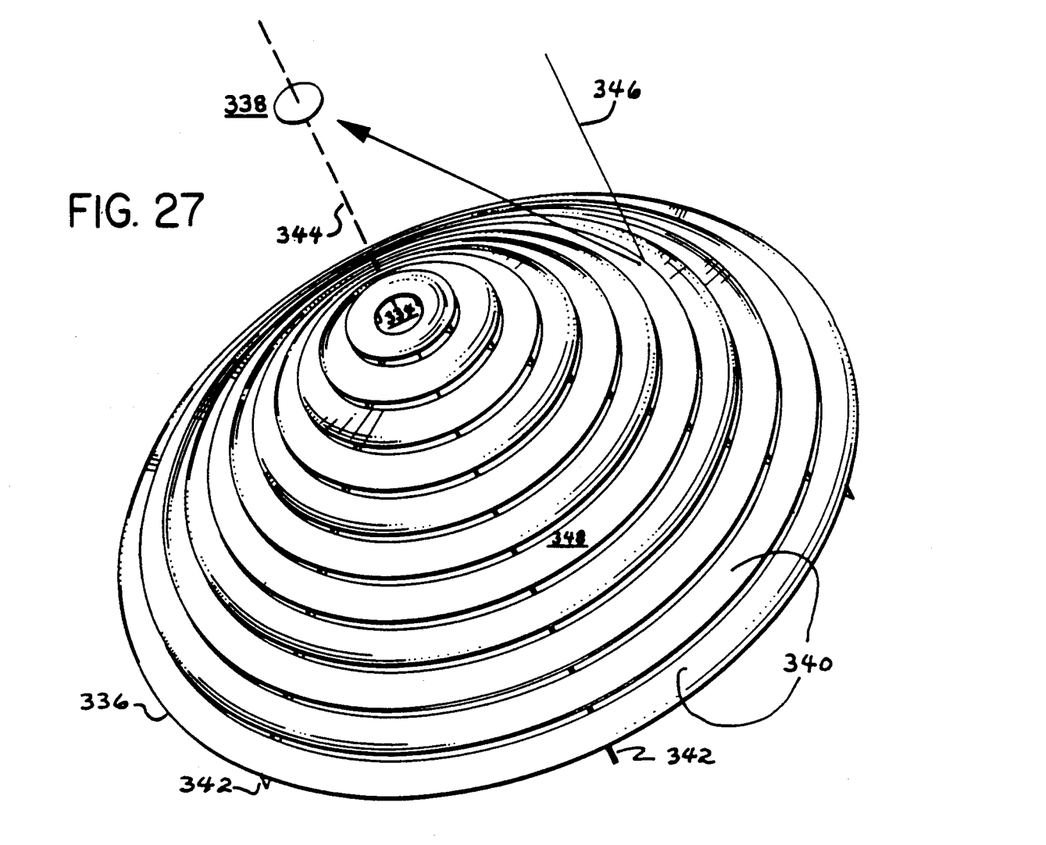
FIG. 27 is a perspective view of a circular aperture, spot focus, convex reflector, using bypass elements.

FIG. 26 shows an especially rigid structural configuration of bypass elements that is to be employed in the positive convex reflectors of FIG. 25 and FIG. 27, when practicable. It is a molded, monocoque construction having integral legs 318 that effect a closed condition between prismatic bypass elements 320. Straight integral ribs 322 impart much of the lateral stability in this configuration and result in a mirror unit having a conic cross section. The path correction lens section 324, supported by a leg, extends over the next outer element, to better transmit the concentrated light 326 from subconcentrator section 328. Majority ray 330 is totally reflected toward the receiver from majority section 332. This one-piece construction would be molded in identical half or quarter sections to facilitate their removal from the mold.

FIG. 27, which incorporates concentric ring bypass elements, is the spot focus version of FIG. 25. This positive convex reflector is a "dome" with its vertex 334 nearer the light source than its rim 336. By comparison, if a paraboloidal dish shared the same rim plane, its concave reflecting surface would be much farther away from the receiver 338, resulting in longer less accurate, path geometries. Circular bypass elements 340 sit atop forward pointing ribs 342. The reflector's unusual shape is favorably paired with a pedestal type tracker, inasmuch as a dome has a more manageable center of gravity than a parabolic dish. In all cases, the optical axis 344 must be pointed directly at a light source for maximum efficiency. Ray 346 is reflected and then bypassed through the next inwardly adjacent element 348 on its way to the receiver 338. The conical version of this mirror is shown in FIG. 26.

In summary, the reader has been shown the basic ways in which light can be bypassed through adjacent mirror elements. And, each physical bypass structure has been detailed to account for the two relevant types of mirror element construction. Then finally, prototype bypass multisurface mirrors are revealed in detail so that the reader will recognize the synergistic nature of the invention.

Although preferred embodiments have been treated in detail, it should be understood that reasonable variations and modifications are possible without departing from the spirit and scope of the invention.

What is claimed is:

1. A radiant energy concentrating multisurface mirror comprising:
    an outer element including integral curved subconcentrating means to collect and focus a portion of incident light;
    an inner mirror element including integral lens means to accept and transmit therethrough the focused light from said subconcentrating means, shortening the distance that light must travel to a receiver.

2. The multisurface mirror as defined in claim 1 wherein the outer mirror element and the inner mirror element are spaced-apart and one long axis edge of the inner mirror element overlaps one coextensive long axis edge of the outer mirror element.

3. The multisurface mirror as defined in claim 1 wherein the outer mirror element further comprises a sandwich construction having two transparent layers enclosing a reflective metal layer, said subconcentrating means including a particular curve integral with said sandwich construction, said curve being parabolic and existing beside the long axis edge that is nearest the inner mirror element.

4. The multisurface mirror as defined in claim 1 wherein the inner mirror element further comprises a sandwich construction having two transparent layers including said integral lens means, said transparent layers enclosing a reflective metal layer, said metal layer including nonmetalized window means disposed paraxially with said lens means to allow said focused light to bypass unobstructed through the inner mirror element to said receiver.

5. The multisurface mirror as defined in claim 1 wherein the inner mirror element further comprises a transparent prismatic construction having a plurality of linear total internal reflecting prisms oriented parallel to the short axis of the inner mirror element, said lens means being integrally formed thereamong said prisms.

6. The multisurface mirror as defined in claim 5 wherein a reflective metal coating is included thereupon said prisms, said metal coating including nonmetalized window means disposed paraxially with said lens means to allow said focused light to bypass unobstructed through the inner mirror element to said receiver.

7. The multisurface mirror as defined in claim 1 wherein the outer mirror element further comprises a transparent prismatic construction having a first surface including said curved subconcentrating means, and a second surface having a plurality of linear total internal reflecting prisms that are oriented parallel to the short axis of the outer mirror element, said subconcentrating means being formed as a plurality of cylindrical lenses existing beside the long axis edge that is nearest the inner mirror element, the vertex of each said cylindrical lens being oriented parallel with said prisms.

8. The multisurface mirror as defined in claim 1 wherein the outer mirror element further comprises a transparent prismatic construction having a plurality of linear total internal reflecting prisms oriented parallel to the short axis of the outer mirror element, said subconcentrating means including a particular curve integral with said prismatic construction, said curve being parabolic and existing beside the long axis edge that is nearest the inner mirror element.

9. A light concentrating multisurface mirror comprising:
    one innermost mirror element including integral lens means for acceptance, collimation and transmission therethrough of concentrated light from the adjacent intermediate mirror element;
    at least one intermediate mirror element including integral cured subconcentrating means for collecting, concentrating and directing a portion of incident light upon said lens means of the innermost mirror element, and including integral lens means for acceptance, collimation and transmission therethrough of concentrated light from an outwardly adjacent mirror element;
    one outermost mirror element including integral curved subconcentrating means for collecting, concentrating and directing a portion of incident light upon said lens means of the adjacent intermediate mirror element.

10. The multisurface mirror of claim 9 wherein the multiple surfaces of said mirror are in a fixed relationship and among axis edge of the innermost mirror element overlaps a coextensive long axis edge of the intermediate mirror element, and the opposite long axis edge of the intermediate mirror element overlaps a coextensive long axis edge of the outermost mirror element.

11. The multisurface mirror of claim 10 wherein the innermost mirror element, the intermediate mirror element and the outermost mirror element are each rectangular in shape and together generate a linear primary focus.

12. The multisurface mirror of claim 10 wherein the innermost mirror element, the intermediate mirror element and the outermost mirror element are each annular in shape and together generate a spot primary focus.

13. The multisurface mirror of claim 9 wherein the innermost mirror element, the intermediate mirror element and the outermost mirror element are each annular in shape and together generate a linear focus coincident with the optical axis of said multisurface mirror.

14. The multisurface mirror of claim 9 wherein the innermost mirror element, the intermediate mirror element and the outermost mirror element together form a segmented concave configuration having a positive focal length.

15. The multisurface mirror of claim 9 wherein the innermost mirror element, the intermediate mirror element and the outermost mirror element together form a segmented planar configuration having a positive focal length.

16. The multisurface mirror of claim 9 wherein the innermost mirror element, the intermediate mirror element and the outermost mirror element together form a segmented convex configuration having a positive focal length.

* * * * *